United States Patent
Suito et al.

(10) Patent No.: US 6,285,818 B1
(45) Date of Patent: Sep. 4, 2001

(54) COMMERCIAL DETECTION WHICH DETECTS A SCENE CHANGE IN A VIDEO SIGNAL AND THE TIME INTERVAL OF SCENE CHANGE POINTS

(75) Inventors: Taro Suito, Kanagawa; Takao Takahashi; Masashi Ohta, both of Tokyo; Toshiya Akiba, Kanagawa; Noboru Murabayashi, Saitama; Naohisa Arai, Kanagawa; Masami Tomita, Chiba, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/014,281

(22) Filed: Jan. 27, 1998

(30) Foreign Application Priority Data

Feb. 7, 1997 (JP) .................................................... 9-025494

(51) Int. Cl.[7] ...................................................... H04N 5/16
(52) U.S. Cl. .............................. 386/46; 348/907; 358/908
(58) Field of Search ................................. 386/1, 45, 46, 386/125, 126, 83; 360/69, 71; 348/571, 907; 358/908; H04N 5/76, 5/783

(56) References Cited

U.S. PATENT DOCUMENTS

| | | | | |
|---|---|---|---|---|
| 4,750,213 | * | 6/1988 | Novak | 358/908 |
| 5,696,866 | * | 12/1997 | Iggulden et al. | 386/46 |
| 5,911,029 | * | 6/1999 | Sakaguchi et al. | 386/46 |
| 5,987,210 | * | 11/1999 | Iggulden et al. | 386/46 |

* cited by examiner

*Primary Examiner*—Thai Tran
(74) *Attorney, Agent, or Firm*—Frommer Lawrence & Haug LLP.; William S. Frommer

(57) ABSTRACT

A commercial detector includes a soundless section detecting circuit which detects a soundless section of an audio signal $S_A$ and a scene change detecting circuit which detects a scene change point of an image from a video signal $S_V$ during the soundless section detected by the soundless section detecting circuit. A commercial section detecting circuit detects whether a time interval of the scene change points detected by the scene change detecting circuit agrees with a predetermined rule. A tuner detects a sound multiplexing mode $S_{SA}$ of an audio signal received.

8 Claims, 7 Drawing Sheets

COMMERCIAL DETECTION WHICH DETECTS A SCENE CHANGE IN A VIDEO SIGNAL AND THE TIME INTERVAL OF SCENE CHANGE POINTS

BACKGROUND OF THE INVENTION

1. Field of the Invention

The present invention relates to a commercial detection apparatus and commercial detection method which can effectively applied to an video recording/reproduction apparatus such as a home video tape recorder.

2. Description of the Prior Art

When reproducing a television broadcast program recorded on a video recording apparatus such as a video tape recorder, a user desires to see the television broadcast program alone, deleting commercials. Thus, it has become possible to record or reproduce a television program deleting commercials.

However, the conventional commercial detection method applied to a home video tape recorder is a simple method which cannot automatically distinguish a television main program from commercials, and the user should manually operate the video tape recorder so as to accurately delete commercials.

The conventional simple commercial detection method will be explained below with reference to an attached drawing. FIG. 1 is a block diagram showing an example of a commercial detecting circuit 20 according to the conventional commercial detecting method mounted on a video tap recorder or the like.

In FIG. 1, an RF signal inputted from an antenna 21 which is an RF input terminal is demodulated by a tuner 22, and a sound broadcasting signal is isolated from the demodulated television broadcasting signal. This sound broadcasting signal is supplied to a soundless section check circuit 23 and a sound multiplexing mode signal detecting circuit 24.

The soundless section check circuit 23 demodulates the sound broadcasting signal into a sound base band signal, whose amplitude level is used to detect soundless sections, and it is determined whether its detection time interval agrees with a predetermined rule.

Generally, a commercial interval is about 15 seconds multiplied by an integer. If the temporal interval of appearance of the soundless sections is 15 seconds multiplied by an integer, it can be determined that a reception signal is a commercial. As a soundless section may occur at other than a start and an end of a commercial, in order to prevent to erroneously identify it as a commercial when it is 15 seconds multiplied by an integer, the aforementioned interval check is carried out on the condition that soundless section of 15 seconds multiplied by an integer is repeated, for example, twice, before identifying it as a commercial and outputting a soundless section check output, i.e., a commercial detection output.

On the other hand, the sound multiplexing mode signal detection circuit 24 detects a current mode of the inputted sound broadcasting signal, i.e., monophonic, stereo, or two-language mode and encodes the current mode, for example, into a 2-bit digital data for output such as '00' for monophonic, '01' for stereo, and '10' for the two-language mode.

Moreover, a main program detecting circuit 25 includes a delay circuit 26, D flip-flop 27, and a pulse generating circuit 28. An output from the sound multiplexing signal detecting circuit 24 is supplied to the delay circuit 26 and delayed by several seconds before introduced to the input terminal of the D flip-flop.

On the other hand, this main program detecting circuit 25 supplies the pulse generating circuit 28 with the interval check output from the soundless section check circuit 23 for observing this check output for about two minutes. If no soundless section check output, i.e., if no commercial detection output is present, it is determined that the current reception signal is not a commercial but a main program and a corresponding pulse is generated. This pulse is introduced to a clock terminal of the aforementioned D flip-flop. Thus, the output of the D flip-flop always maintain an encoding value of the sound multiplexing mode of the main program.

It should be noted that the reason why the detection output of the sound multiplexing mode is delayed by the delay circuit 26 is that it is predicted that a change will occur in the sound multiplexing mode when a commercial detection which is a soundless detection is outputted, and it is necessary to prevent that the sound multiplexing mode detection output becomes unstable when the commercial detection output is supplied to the clock terminal of the D flip-flop.

Moreover, the reason why about two minutes are set for observing the commercial detection output in the soundless section check circuit 23 is that generally a commercial is completed within one minute and it is preferable to reduce the response time. An output of the aforementioned D flip-flop 27 is the output of the main program mode output circuit 25.

A mode comparator circuit 29 compares the output of the main program mode detecting circuit 25 to the output of the sound multiplexing mode signal detecting circuit 24. If they coincide, it is determined that a current reception signal is a main program; and if not, it is determined that the current reception signal is a commercial. The result of the comparison is outputted.

In general, when the sound multiplexing mode is changed from the main program mode to another mode and after the mode is not returned to the main program mode but to a third mode, it is predicted that it is a switching point of the programs. In this case, the mode comparator circuit 29 outputs a decision result that main program/commercial indefinite.

The aforementioned commercial detecting circuit 20 carries out commercial detection only according to sound information i.e., sound multiplexing mode and soundless section interval. This often causes an erroneous detection.

Especially when the main program is a stereo broadcasting or two-language broadcasting, there is no method to prevent an erroneous detection. As has been described above, it is known to detect a commercial according to sound information but it is only simplified method and there has been no definite means to enhance the detection accuracy.

SUMMARY OF THE INVENTION

It is therefore an object of the present invention to provide a commercial detection apparatus and detection method capable of accurately determine whether a current reception television broadcasting signal is a commercial or a main program.

The commercial detection apparatus according to the present invention detects with soundless section detecting means a soundless section in a received audio signal, detects with scene change detecting means a scene change point of an image from a video signal during said soundless section, detects with scene change interval detecting means whether a time interval of the scene change points agrees with a predetermined rule, and detects with sound multiplexing mode detecting means a sound multiplexing mode of the received audio signal.

Moreover, the commercial detection method according to the present invention, in order to achieve the aforementioned object, detects a soundless section in a received audio signal, detects a scene change point of an image from a received video signal during the soundless section; and detects that a time interval of the scene change points agrees with a predetermined rule and a sound multiplexing mode of said received audio signal is stereo.

More specifically, the present invention is based on that a soundless section of 0.1 to 2 seconds is present with a high probability between a main program and a commercial or between commercials; that a scene change point of an image is present during the soundless section; that each commercial lasts for 15 seconds multiplied by an integer; and that during a commercial broadcast section, the sound multiplexing mode is a stereo mode. Consequently, if the scene change point during a soundless section appears for every 15 seconds multiplied by an integer and if the section of 15 seconds multiplied by an integer is on a stereo broadcast mode, then the section is determined to be a commercial section.

DETAILED DESCRIPTION OF THE PREFERRED EMBODIMENTS

Description will now be directed to a commercial detection apparatus and detection method according to an embodiment of the present invention with reference to the attached drawings.

Figure 1:
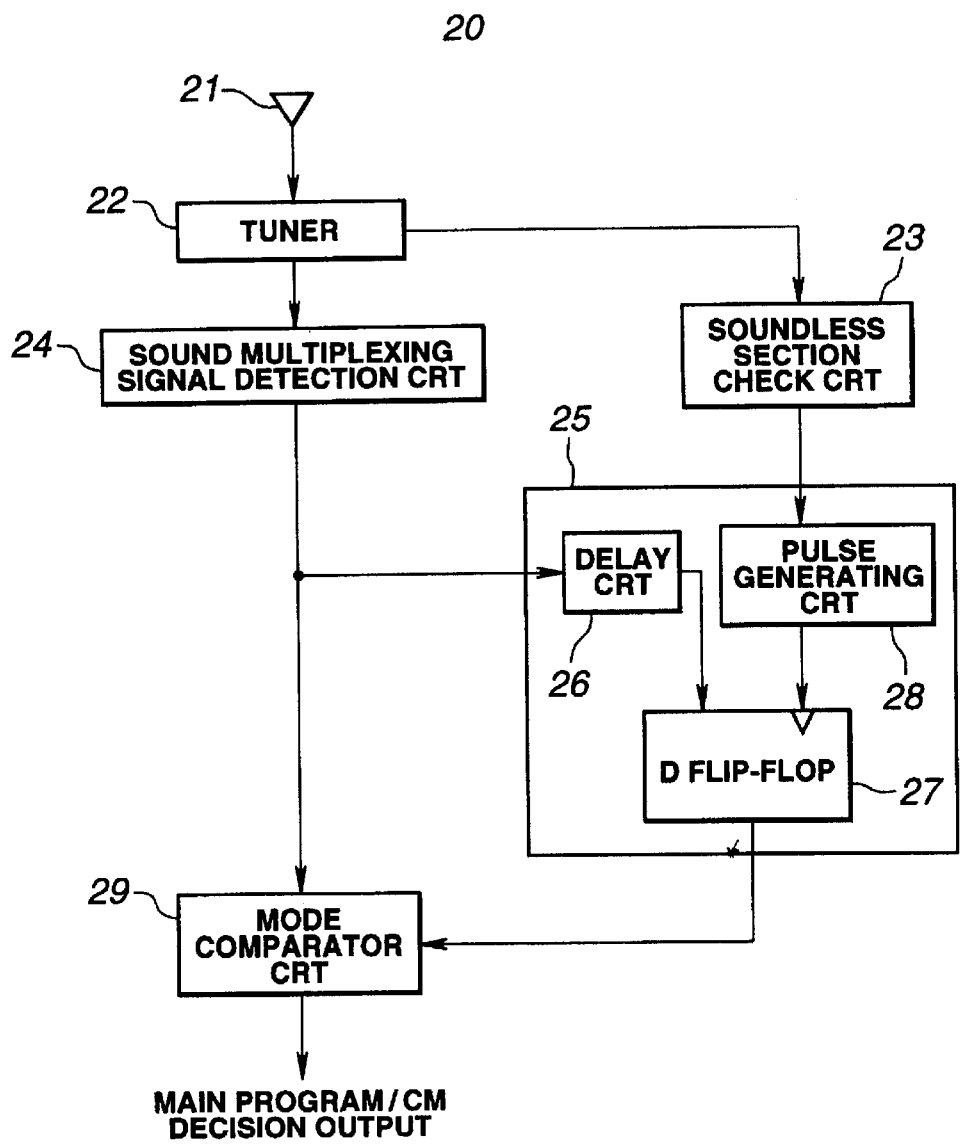
FIG. 1 is a block diagram of a video tape recorder which employs a conventional commercial detection method.
Figure 2:
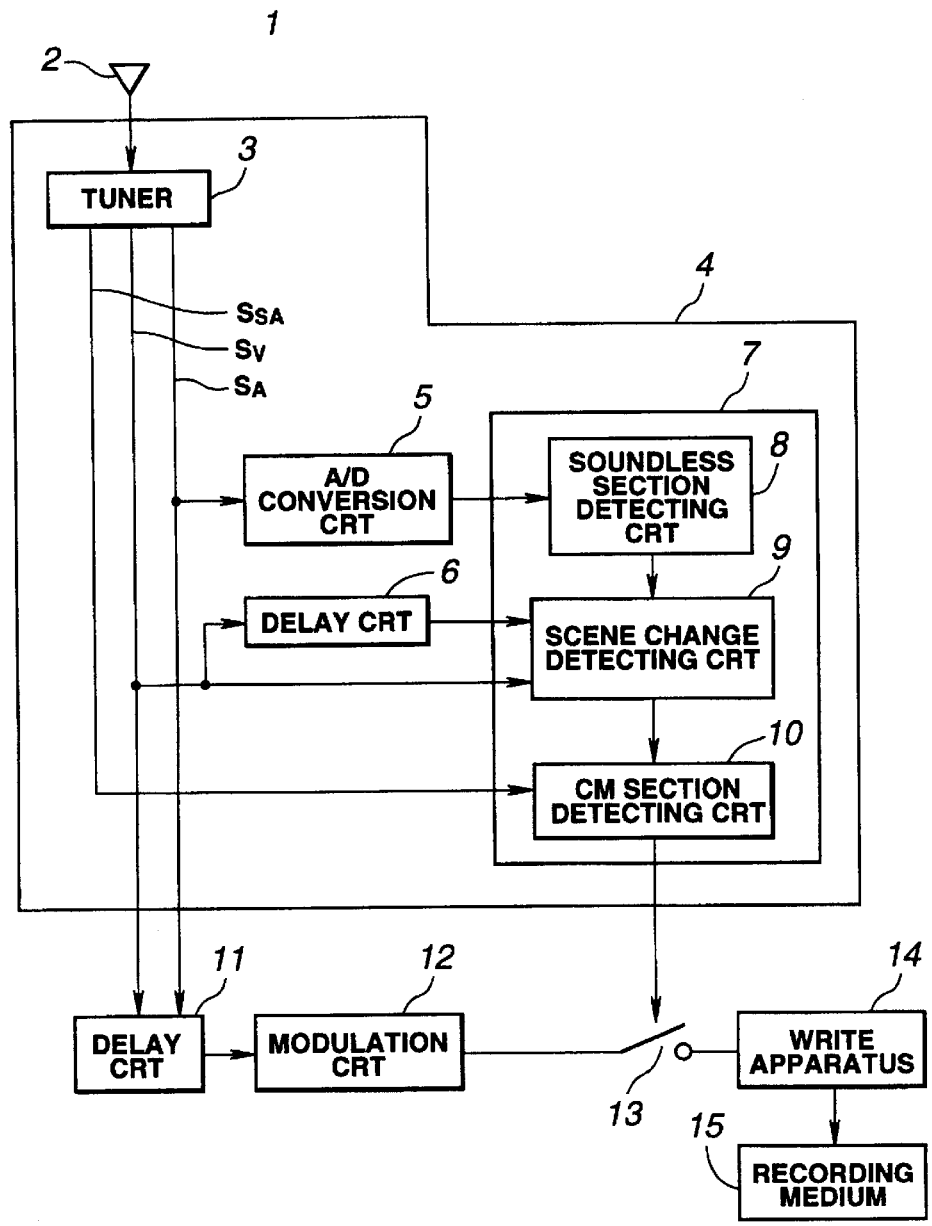
FIG. 2 is a block diagram of a television broadcast recording apparatus having a commercial detecting circuit of the commercial detection apparatus and method according to an embodiment of the present invention.

FIG. 2 shows a commercial detecting circuit 4 according to the embodiment provided in a television broadcast recording apparatus 1. The commercial detecting circuit 4 detects whether a television broadcast signal consisting of a video signal and an audio signal is a commercial or not.

In this television broadcast recording apparatus 1, an RF signal is inputted from an antenna 2 which is an RF input terminal and demodulated by a tuner 3 into an audio signal $S_A$, a sound multiplexing signal $S_{SA}$, and a video signal $S_V$, each of which is supplied to the commercial detecting circuit 4. The tuner 3 detects a sound multiplexing mode from a sound multiplexing pilot signal or the like and supplies the aforementioned sound multiplexing signal $S_{SA}$ to the commercial detecting circuit 4.

The sound multiplexing mode may be one of the following three: monophonic, stereo, and two-language modes. In this embodiment, the stereo mode is encoded as "1" and the other modes are encoded as "0".

The commercial detecting circuit 4 includes: a soundless section detecting circuit 8 for detecting a soundless section of the aforementioned audio signal $S_A$; a scene change detecting circuit 9 for detecting a scene change point of the image from the video signal $S_V$ in the soundless section detected by the soundless section detecting circuit 8; a commercial section detecting circuit 10 serving as scene change interval detecting means for detecting whether the time interval of the scene change points detected by the scene change detecting circuit 9 agrees with a predetermined rule; and the aforementioned tuner 3 serving as sound multiplexing mode detecting means for detecting the sound multiplexing mode $S_{SA}$ of the aforementioned reception audio signal.

The commercial detecting circuit 4 uses the audio signal $S_A$, the video signal $S_V$, and the sound multiplexing mode signal $S_{SA}$ inputted from the tuner 3, for detecting a commercial and outputs a commercial decision signal.

Description will now be directed to the signal flow and processing in this commercial detecting circuit 4. The audio signal $S_A$ inputted from the tuner 3 is subjected to A/D conversion in the A/D conversion circuit 5, i.e., digitization with a predetermined sampling frequency and quantization at a predetermined quantization level. In this embodiment, the sampling frequency is 16 KHz and the bit length is 16 bits.

The audio data which has been digitized by the A/D conversion circuit is supplied to the soundless section detecting circuit 8 in a main processor 7. In this embodiment, the main processor 7 is a computer and the soundless section detecting circuit, the scene change detecting circuit 9, and the commercial section detecting circuit 10 are realized by software.

The soundless section detecting circuit 8 calculates an average sound level for each of the frames and determines whether the average level is smaller than a predetermined threshold value for detecting soundless section. FIG. 3 shows a calculation of the aforementioned average sound level, and FIG. 4 shows a flow of the soundless section detection.

Figure 3A:
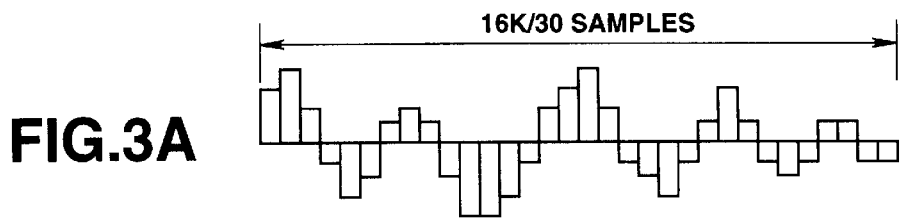
FIGS. 3A–3C explains calculation of an average sound level for each frame carried by a soundless section detecting circuit constituting the aforementioned commercial detecting circuit.
Figure 3B:
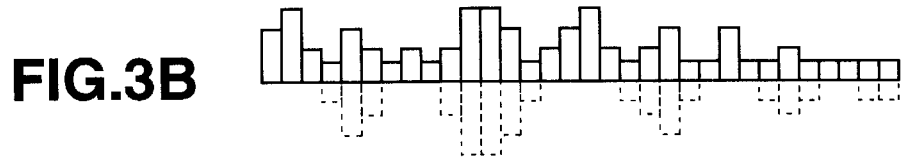
Figure 3C:
Figure 4:
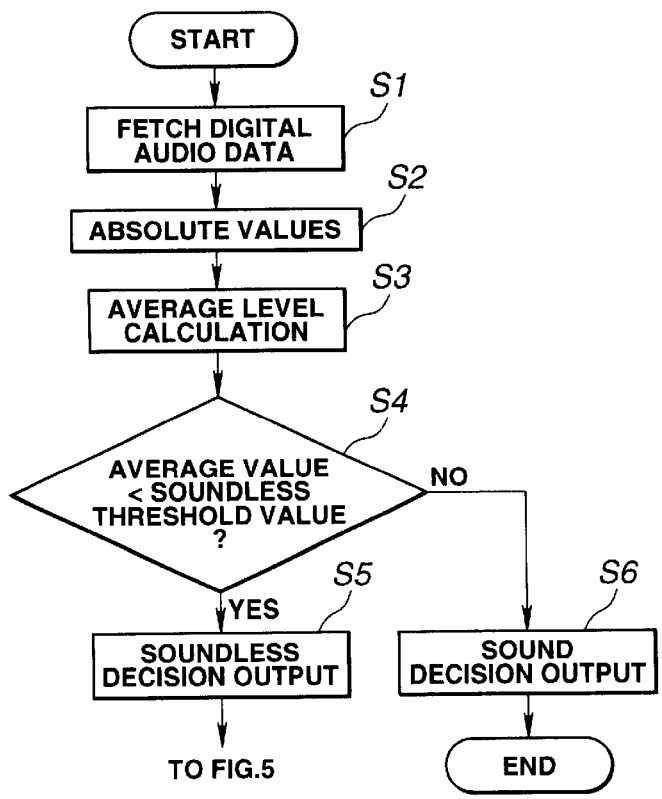
FIG. 4 is a flowchart showing the processing of the aforementioned soundless section detecting circuit.

Firstly, in step S1 of FIG. 4, the soundless section detecting circuit 8 fetches a digital audio data outputted from the A/D conversion circuit 5. Here, the processing is carried out at a rate of 30 frames per second and as shown in FIG. 3A, a digital audio data of 16 KHz/30 frames (samples) is fetched. Subsequently, in step S2, absolute values of the aforementioned samples are determined as shown in FIG. 3B. In step S3, an average level is calculated as shown in FIG. 3C.

Next, in step S4, it is determined whether the aforementioned average level is smaller than a predetermined soundless threshold value. If the aforementioned average level is determined to be smaller than the predetermined threshold value, a soundless decision is outputted in step S5. On the contrary, if the aforementioned average level is equal to or greater than the predetermined threshold value, a sound decision is outputted in step S6. Output of a soundless decision means that the frame is in a soundless section.

On the other hand, the video signal $S_V$ outputted from the tuner 3 is inputted to the commercial detecting circuit 4 and supplied to a delay circuit 6, a delay circuit 11, and the scene change detecting circuit 9.

The delay circuit 6 is composed of a frame memory of a predetermined number of frames, for example, one frame. In this delay circuit 6, the video signal is delayed by a time corresponding to the predetermined number of frames and inputted to the scene change detecting circuit 9.

Figure 5:
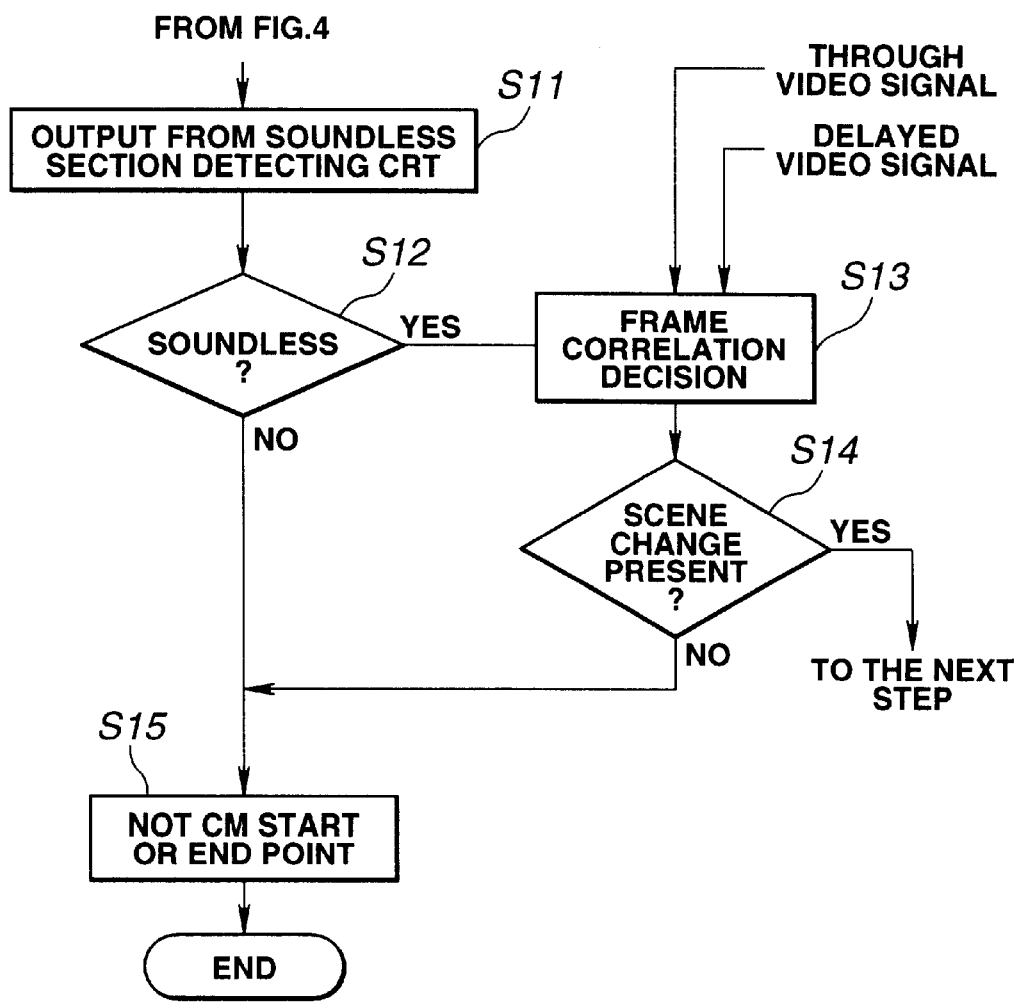
FIG. 5 is a flowchart showing the processing of a scene change detecting circuit constituting the aforementioned commercial detecting circuit.

The scene change detecting circuit 9 is supplied with an output from the soundless section detecting circuit 8, the video signal which has been delayed, and a through video signal supplied directly from the tuner 3 without delay, and carries out a scene change detection in a soundless section. FIG. 5 is a flowchart showing the flow of the processing in this scene change detecting circuit 9.

Firstly, in step S11, an output from the soundless section detecting circuit 8 is fetched, and in step S12, it is determined whether the aforementioned output is soundless. If the output is determined to have a sound, control is passed to step S15 where an output indicating no candidate of a commercial start or end is outputted because the frame is not a commercial start or end. If in step S12, the output is determined to be soundless, control is passed to a scene change decision routine of step S13 and S14.

Figure 6A:
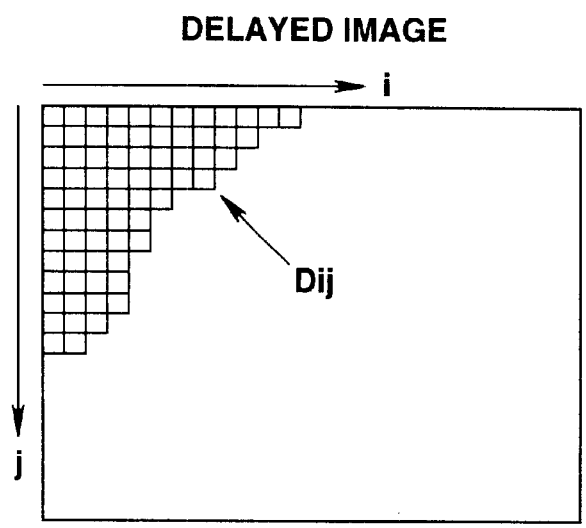
FIGS. 6A–6B explains a frame correlation decision carried out by the aforementioned scene change detecting circuit.
Figure 6B:
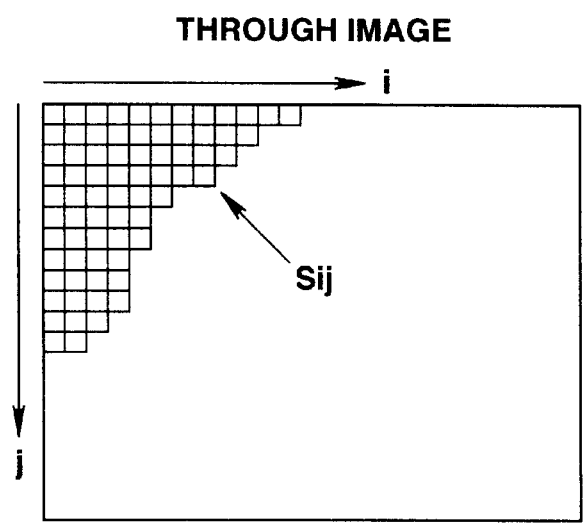

Step S13 carries out a frame correlation decision in which the delayed video signal is compared to the through video signal and their correlation is calculated. The correlation calculation may be for example (1) use of correlation of a histogram of video signal levels, (2) a method in which a difference is obtained between the pixels and its integrated value is used for a correlation value, or (3) a method in which a screen is divided into a plurality of areas and correlation is calculated between the areas to find the greatest correlation. The present embodiment employs the method (2) which is considered to be the simplest one. This method (2) will be explained below with reference to FIG. 6.

It is assumed that the delayed video data and the through video data have an image size of n×m. Assuming i for a horizontal direction coordinate and j for a vertical direction coordinate, $D_{ij}$ is a data of the delayed video image of coordinates (i, j) and $S_{ij}$ is a data of the through video image of coordinates (i, j).

The correlation value E of two images can be expressed as follows, assuming abc as a function to obtain an absolute value.

$$E = \Sigma\Sigma \text{abc}\, (D_{ij} - S_{ij})$$

If the correlation value E between the images calculated in step S13 is greater than a predetermined threshold value, the correlation degree between the two images is small and control is passed to the following step S14 where an output is made indicating a scene change, i.e., a candidate of a commercial start or end. If the output value in step S13 is smaller than the predetermined threshold value, control is passed to step S15 where an output is made indicating that this frame is not a candidate of a commercial start or end.

The output of the scene change detecting circuit 9 and the sound multiplexing mode signal SSA are supplied to the commercial section detecting circuit 10. The commercial section detecting circuit 10 has a memory area for storing the output from the scene change detecting circuit 9 and the sound multiplexing mode signal from the tuner 3 of a predetermined time. In general, a commercial in a television broadcast lasts one minuets at the longest, and there is provided a RAM for one minute, i.e., 120 (seconds)×30 (frames)×2 (data)×1 (bit).

Figure 7:
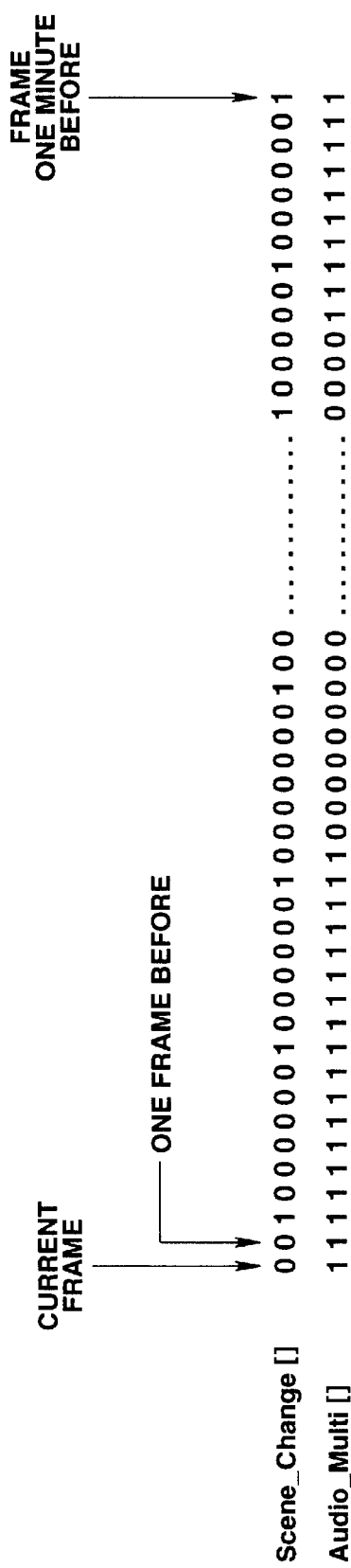
FIG. 7 explains the data processing in an RAM provided in a commercial interval detecting circuit constituting the aforementioned commercial detecting circuit.

As shown in FIG. 7, the RAM stores "1" in Scene__Change [Frame] if the output from the scene change detecting circuit 9 is a candidate of a commercial start or end point, and "0" if the output is not a candidate.

Similarly, "1" is stored in Audio__Multi [Frame] if the sound multiplexing mode signal from the tuner 3 is stereo, and "0" if other than stereo, i.e., monophonic or bilingual. The Scene__Change [Frame] in the RAM has an area of a current frame up to a frame of one minute before.

Figures 8A, 8B, 8C:
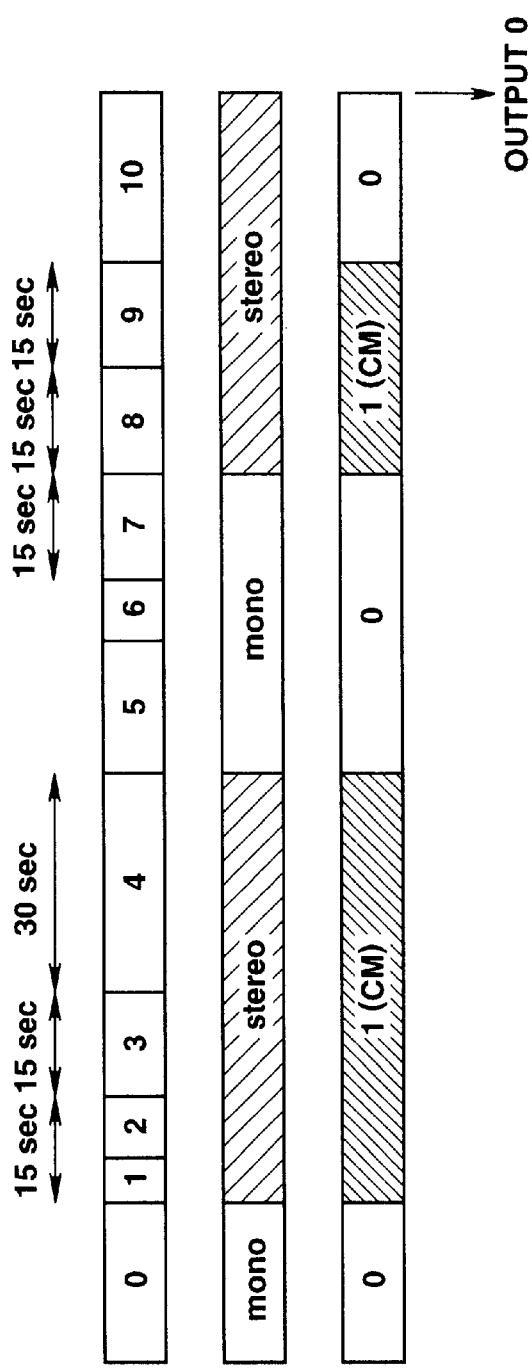
FIGS. 8A–8C shows a detection example of a commercial interval carried out by the aforementioned commercial interval detecting circuit.

FIG. 8 shows an example of actual detection of a commercial section in the commercial section detecting circuit 10. FIG. 8A shows sections divided by every scene change; FIG. 8B shows sections based on the sound multiplexing mode; and FIG. 8C shows commercial detection results.

In sections 1 to 4, the sound multiplexing mode is stereo and the sections are continuous, each being 15 second multiplied by an integer. Consequently, sections 1 to 4 are detected as a commercial section. Section 7 lasts 15 seconds and continuous to sections 8 and 9, but the sound multiplexing mode is monophonic. Consequently, this section is not determined to be a commercial.

The commercial section detecting circuit 10 outputs "1" if a frame one minute before is determined to be a commercial and "0" if the frame is not determined to be a commercial.

On the other hand, the audio signal SA and the video signal SV outputted from the tuner 3 are also supplied to the delay circuit 11. When recording on a recording medium an audio data and a video data which have been modulated, it is necessary that the data is synchronized with a commercial detection signal outputted from the commercial section detecting circuit 10. This delay circuit 11 carries out this synchronization. In the present embodiment, the commercial section detecting circuit 10 has a buffer (memory) for one minute for commercial detection, it is necessary to carry out one-minute delay processing in the delay circuit 11. This can also be realized in a memory, but in the present embodiment, it is realized by using a hard disc drive because of the capacity.

An output from this delay circuit 11 is supplied to a modulation circuit 12. Here, modulation such as EFM modulation is carried out into a signal form for writing the audio and the video signal on a recording medium. Data compression such as MPEG and JPEG is also contained here.

An output from this modulation circuit 12 is supplied to a write apparatus 14 and recorded on a recording medium 15 if a write allow switch 13 is set to a write allowed state. The write allow switch 13 is closed if the commercial detection signal from the commercial section detecting circuit 10 is "1", and audio and video signals modulated are transmitted to the write apparatus 14.

The write apparatus 14 has a function to record electrically or magnetically or optically or physically or by combination of them on the recording medium 15 the audio and video signals after modulation supplied through the write allow switch 13.

The recording medium 15 is a medium capable of recording/storing a data such as a writable compact disc, magneto-optical disc, and a hard disc.

Thus, the television broadcast recording apparatus 1 according to the embodiment of the present invention includes a commercial detecting circuit 4 capable of accurate commercial detection and enables to record a main program alone on the recording medium 15 deleting commercials.

What is claimed is:

1. A commercial detection apparatus for detecting whether a reception content of a television broadcast signal consisting of a video signal and an audio signal is a commercial, said apparatus comprising:

soundless section detecting means for detecting a soundless section in said audio signal;

scene change detecting means for detecting a scene change point of an image from a video signal during said soundless section detected by said soundless section detecting means;

scene change interval detecting means for detecting whether a time interval of the scene change points detected by said scene change detecting means agrees with a predetermined rule; and sound multiplexing mode detecting means for detecting a sound multiplexing mode of said received audio signal.

2. A commercial detection apparatus as claimed in claim 1, said scene change interval detecting means detects whether said time interval of the scene change points is 15 seconds multiplied by an integer.

3. A commercial detection method comprising:

a step of detecting a soundless section in a received audio signal;

a step of detecting a scene change point of an image from a received video signal during said soundless section; and a step of detecting that a time interval of the scene change points agrees with a predetermined rule and a sound multiplexing mode of said received audio signal is stereo, such that a reception content of a television broadcast signal is a commercial.

4. A commercial detection method as claimed in claim 3, wherein said time interval of the scene change points is 15 seconds multiplied by an integer.

5. A recording apparatus for recording a video signal and an audio signal, said apparatus comprising:

commercial detecting means for detecting whether a reception content of a television broadcast signal consisting of a video signal and an audio signal is a commercial; and switching means for switching whether to carry out recording according to a detection result of said commercial detecting means, said commercial detecting means having:

soundless section detecting means for detecting a soundless section in said audio signal;

scene change detecting means for detecting a scene change point of an image from a video signal during said soundless section detected by said soundless section detecting means;

scene change interval detecting means for detecting whether a time interval of the scene change points detected by said scene change detecting means agrees with a predetermined rule; and a sound multiplexing mode detecting means for detecting a sound multiplexing mode of said audio signal received.

6. A recording apparatus as claimed in claim 5, wherein said scene change interval detecting means detects whether said time interval of the scene change points is 15 seconds multiplied by an integer.

7. A recording method of a video and audio signal recording apparatus comprising commercial detecting means characterized by: a step of detecting a soundless section in a received audio signal; a step of detecting a scene change point of an image from a received video signal during said soundless section; and if a time interval of the scene change points agrees with a predetermined rule and a sound multiplexing mode of said received audio signal is stereo, a reception content of a television broadcast signal is detected to be a commercial during which no recording is carried out.

8. A recording method as claimed in claim 7, wherein said time interval of the scene change points is 15 seconds multiplied by an integer.

* * * * *